(12) United States Patent
Osoinach et al.

(10) Patent No.: US 8,599,166 B2
(45) Date of Patent: Dec. 3, 2013

(54) TOUCH SENSOR CONTROLLER FOR DRIVING A TOUCH SENSOR SHIELD

(75) Inventors: Bryce T. Osoinach, Phoenix, AZ (US); Lawrence T. Roshak, Chandler, AZ (US); Craig R. Teegarden, Pittsburgh, PA (US)

(73) Assignee: Freescale Semiconductor, Inc., Austin, TX (US)

( * ) Notice: Subject to any disclaimer, the term of this patent is extended or adjusted under 35 U.S.C. 154(b) by 166 days.

(21) Appl. No.: 12/870,491

(22) Filed: Aug. 27, 2010

(65) Prior Publication Data

US 2012/0050203 A1 Mar. 1, 2012

(51) Int. Cl.
*G06F 3/045* (2006.01)
*G09G 5/00* (2006.01)

(52) U.S. Cl.
USPC ............................... 345/174; 345/156

(58) Field of Classification Search
USPC ..................... 178/18.06; 345/174
See application file for complete search history.

(56) References Cited

U.S. PATENT DOCUMENTS

| 5,457,289 A | 10/1995 | Huang et al. | |
|---|---|---|---|
| 5,548,306 A | 8/1996 | Yates, IV et al. | |
| 2007/0034423 A1* | 2/2007 | Rebeschi et al. | 178/18.06 |
| 2008/0142281 A1* | 6/2008 | Geaghan | 178/18.06 |

* cited by examiner

*Primary Examiner* — Michael Faragalla
(74) *Attorney, Agent, or Firm* — Daniel D. Hill

(57) ABSTRACT

A touch pad controller includes a voltage generator and a selector circuit. The voltage generator has a plurality of output terminals, each of the plurality of output terminals for being coupled to a corresponding pad of a plurality of capacitive touch pads. The voltage generator provides a predetermined voltage to each of a plurality of touch pads in a predetermined sequence. The selector circuit has a plurality of input terminals. Each input terminal of the plurality of input terminals is coupled to an output terminal of the plurality of output terminals of the voltage generator. The selector circuit sequentially couples each output terminal of the plurality of output terminals of the voltage generator to a touch pad shield for charging the touch pad shield to the predetermined voltage.

20 Claims, 2 Drawing Sheets

TOUCH SENSOR CONTROLLER FOR DRIVING A TOUCH SENSOR SHIELD

BACKGROUND

1. Field

This disclosure relates generally to touch sensors, and more specifically, to a touch sensor controller for driving a touch sensor shield.

2. Related Art

Touch sensors have been available for a number of years as a relatively inexpensive alternative to mechanical switches. One type of touch sensor, commonly known as a capacitive touch sensor, or pad, detects a change in capacitance when an object, such as a human finger touches the pad. In an application such as a telephone touch pad, a number of capacitive touch pads are arranged as an array, or matrix, of touch pads that are spaced apart and arranged as the telephone shape, size and design allows.

A touch sensor controller is used to control operation of the touch sensor and provides detection circuitry for determining when a pad is touched. As part of the function of the detection circuitry, a baseline capacitance may be established on each pad. Touching a pad changes the capacitance and the change is detected by the touch sensor controller. A touch sensitivity of the pads is established, as least in part, by the baseline capacitance. An increase of the baseline capacitance can decrease sensitivity.

There are many environmental and design conditions that can affect the baseline capacitance of the capacitive touch pads. For example, the baseline capacitance of the pads can be increased by the presence of a person's hand near the touch pads. Shielding around the touch pads can be used to reduce the effects of stray capacitance. Typically, the shielding is formed as a ring around each pad, or as a plane or casing on the backside of a printed circuit board (PCB) supporting the pads, or both. The shielding may be grounded. A potential difference between the pads and the shield may result in a parasitic capacitance between the shield and the pads, thus changing the baseline capacitance and reducing touch sensitivity.

Therefore, what is needed is a touch sensor controller that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a capacitive touch pad controller that includes circuitry for driving a touch pad shield. The shield is charged to a voltage equal to the voltage on the touch pads. In one embodiment, a plurality of pads is charged to a predetermined voltage one pad at a time in a sequential order. The touch pad controller includes a voltage generator, a selector circuit, and a voltage follower for providing the pad voltage to the shield. When one touch pad is being charged, the charge voltage is provided to the shield in addition to the touch pad. The shield may be in the form of shield rings around each pad, or a shield on the backside of the pads, or both. By maintaining the shield voltage to be the same as the touch pad voltage, a parasitic capacitance between the pads and the shield is significantly reduced, thus improving touch sensitivity.

Note that as used herein, the terms touch pad, touch sensor, and electrode will be used interchangeably to refer to a capacitive touch sensor that senses a change in capacitance and provides a signal in response. Also, the conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
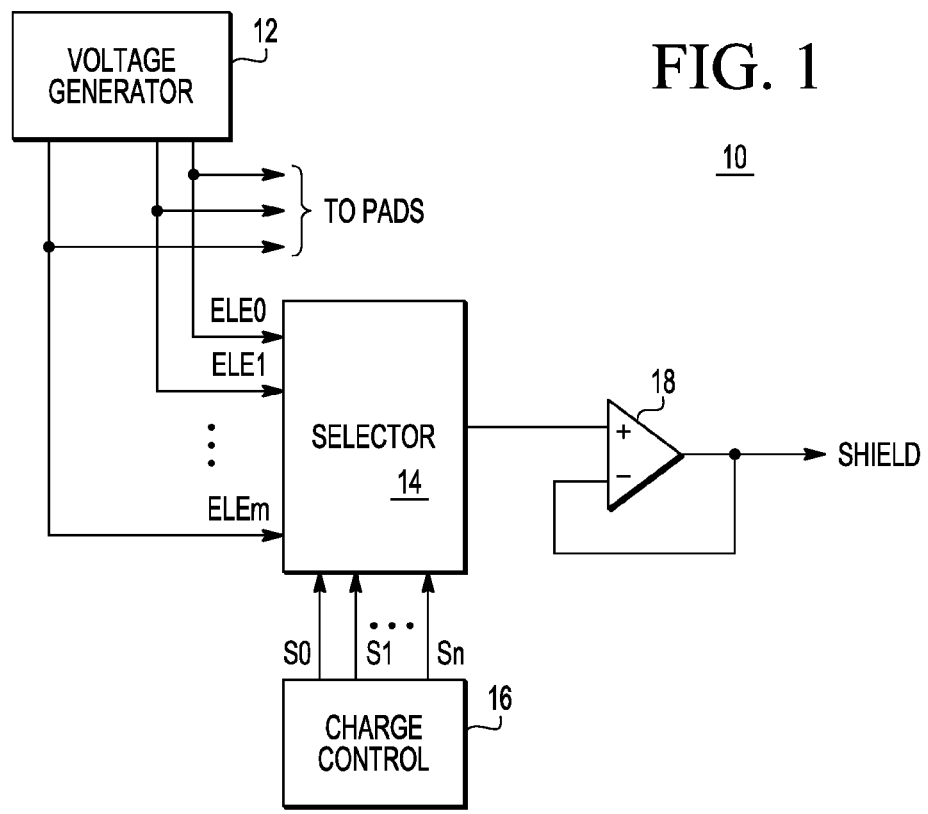
FIG. 1 illustrates, in block diagram form, a touch sensor controller for driving a touch sensor shield in accordance with an embodiment.

FIG. 1 illustrates, in block diagram form, a portion of a touch sensor controller 10 for driving a touch sensor shield for shielding a plurality of touch sensors in accordance with an embodiment. In one embodiment, the plurality of touch sensors is used on a telephone or cell phone. Touch sensor controller 10 is for charging a plurality of capacitive touch sensors to establish a baseline capacitance on each of the plurality of touch sensors. The plurality of touch sensors are conventional capacitive touch sensors of the type used to replace mechanical switches. Each touch sensor of the plurality of touch sensors is charged periodically and the plurality of touch sensors are charged in a sequential order. The illustrated portion of ouch sensor controller 10 includes voltage generator 12, selector circuit 14, charge control circuit 16, and a voltage follower 18. Other portions of touch sensor controller 10 not used for charging the shield, such as for example, the touch detection circuitry, are not illustrated in FIG. 1. Voltage generator 12 includes a plurality of output terminals labeled ELE0-ELEm, where m is an integer. Each of the output terminals ELE0-ELEm corresponds with, and is connected to, a single pad. The number of pads can be any number and integer m is equal the number of pads. In one embodiment, m is equal to 12. Voltage generator 12 is for providing a predetermined voltage on each of the plurality of output terminals in a predetermined sequence. In one embodiment, voltage generator 12 is characterized as being a conventional capacitance-to-voltage converter. In another embodiment, voltage generator 12 may generate a voltage in a different way.

Selector circuit 14 includes a plurality of input terminals coupled to the plurality of output terminals of voltage generator 12 in a one-to-one correspondence. Selector circuit 14 also includes a plurality of control terminals for receiving control signals labeled S0-Sn, where n is an integer. The plurality of control signals S0-Sn causes one of the plurality of input terminals of selector circuit 14 to be connected to an output terminal of selector circuit 14. In one embodiment, selector circuit 14 is a conventional multiplexer. The plurality of control signals S0-Sn is provided by charge control circuit 16.

Voltage follower 18 has a first input terminal coupled to the output of selector circuit 14, an output terminal for providing a voltage labeled "SHIELD", and a second input terminal coupled to the output terminal of the voltage follower. Voltage follower 18 is a conventional voltage follower circuit that is used to boost a current capacity of voltage SHIELD without changing the voltage level of voltage SHIELD. In one embodiment, the voltage follower is implemented using an operational amplifier, where the first input terminal is a positive input and the second input terminal is a negative input.

Figure 2:
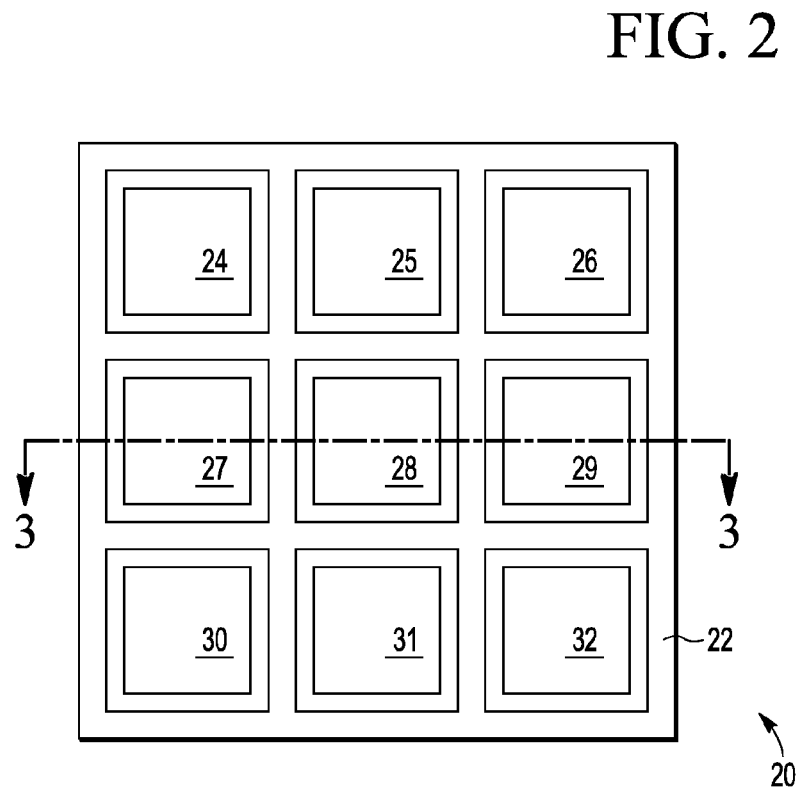
FIG. 2 illustrates a top down view of a plurality of capacitive touch sensor pads with shield rings.

FIG. 2 illustrates a top down view of a plurality of capacitive touch sensor pads 20 with shield rings 22. Touch sensor pads 20 includes pads 24-32 organized in a grid. Nine touch sensor pads are provided in FIG. 2 for illustration purposes only. There can be any number of touch sensor pads depending on the application. For example, a conventional telephone may include 12 pads. Also, touch sensor pads 20 are rectangular. In other embodiments, touch sensor pads 20 can be any shape. In the illustrated embodiment, shield ring 22 is provided around each of touch sensor pads 24-32. In another embodiment, shield ring 22 may have a different shape. For example, shield rings 22 may comprise a plurality of individual rings, where each of the individual rings surrounds one of the pads and all of the rings are electrically connected together.

In operation, voltage generator 12 charges each pad of pads 24-32 to a predetermined voltage. The predetermined voltage establishes a baseline capacitance on each pad. Any of a number of different techniques for charging the touch sensor pads can be used in accordance with the illustrated embodiment. In one embodiment, voltage generator 12 provides the predetermined voltage to each pad, one pad at a time, in a sequential order. Voltage generator 12 cycles through the sequential order continuously to maintain the baseline capacitance on each pad.

At same time the predetermined voltages ELE0-ELEm are being sequentially provided to the pads, selector circuit 14 and control circuit 16 provide the same voltages to charge and maintain shield 22 to the same voltages. By charging shield rings 22 to the same voltages as is provided to each of the touch pads, a differential voltage does not exist between the touch pads 24-32 and shield rings 22 and a parasitic capacitance does not form between pads 24-32 and shield rings 22.

Figure 3:
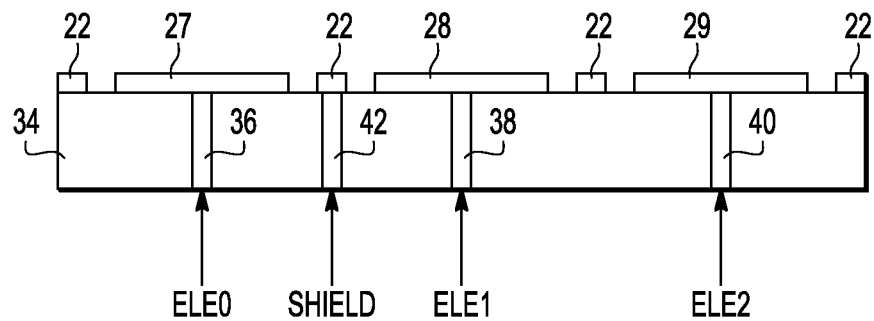
FIG. 3 illustrates a cross-sectional view of the plurality of capacitive touch sensor pads along the line 3-3 of FIG. 2.

FIG. 3 illustrates a cross-sectional view of the plurality of capacitive touch sensor pads 20 of FIG. 2 along the line 3-3. The line 3-3 bisects pads 27, 28, and 29 of FIG. 2. The pads are positioned on a printed circuit board (PCB) 34. Shield rings 22 can be seen between each of pads 27, 28, and 29. There are a number of different techniques for electrically connecting touch sensor controller 10 to the pads 27, 28, and 29 and to shield rings 22. In FIG. 3, the pads and shield are connected to touch sensor controller 10 using vias through to a bottom of PCB 34. For example, via 36 connects pad 27 to signal ELE0, via 38 connects pad 28 to signal ELE1, and via 40 connects pad 29 to signal ELE2. Signal SHIELD is connected to shield rings 22 using via 42. In other embodiments, the pads and shield may be connected to touch controller 10 in a different way. For example, PCB 34 may include multiple layers and the vias do not have to go all of the way through PCB 34. Also, in another embodiment, the pads and shield may be connected to touch controller 10 using conductive traces on the same side of PCB 34 as pads 27,28,and 29.

Figure 4:
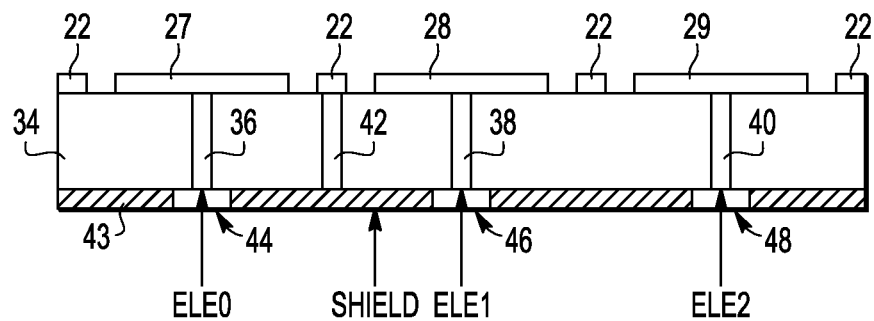
FIG. 4 illustrates a cross-sectional view in accordance with another embodiment of FIG. 3.

FIG. 4 illustrates a cross-sectional view of the touch sensor pads 20 of FIG. 2 in accordance with another embodiment of FIG. 3. FIG. 4 differs from FIG. 3 in that FIG. 4 includes a backside shield 43 on the bottom of PCB 34. Holes 44, 46, and 48 are provided in shield 43 to allow signals ELE0, ELE1, and ELE2 to be provided to pads 27, 28, and 29. Shields 43 and 22 are connected together using via 42. The voltage SHIELD is provided to shield 43 and then provided to shield 22 through via 42. In another embodiment, shields 22 and 43 may be connected together in a different way. Also, voltage SHIELD may be provided to shields 22 and 43 in a different way. Alternately, backside shield 43 may be used alone instead of in conjunction with shield rings 22 as illustrated in FIG. 4.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

In one embodiment, the illustrated elements of touch pad controller 10 are circuitry located on a single integrated circuit or within a same device. Alternatively, the touch pad controller 10 may include any number of separate integrated circuits or separate devices interconnected with each other. Also for example, the touch pad controller 10 or portions thereof may be soft or code representations of physical circuitry or of logical representations convertible into physical circuitry. As such, the touch pad controller 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A touch pad controller comprising:
a voltage generator having a plurality of output terminals, each of the plurality of output terminals for being coupled to a corresponding pad of a plurality of capacitive touch pads, the voltage generator for providing a predetermined voltage to each of the plurality of capacitive touch pads in a predetermined sequence; and
a selector circuit having a plurality of input terminals, each input terminal of the plurality of input terminals coupled to an output terminal of the plurality of output terminals of the voltage generator, the selector circuit for sequentially coupling each output terminal of the plurality of output terminals of the voltage generator to a touch pad shield, for charging the touch pad shield to the predetermined voltage.

2. The touch pad controller of claim 1, wherein the voltage generator is characterized as being a capacitance-to-voltage converter.

3. The touch pad controller of claim 1, wherein the touch pad shield comprises a shield ring around each of the plurality of touch pads.

4. The touch pad controller of claim 1, further comprising a voltage follower coupled to an output terminal of the selector circuit.

5. The touch pad controller of claim 4, wherein the voltage follower comprises an operational amplifier having a positive input coupled to the output terminal of the selector circuit, an output coupled to the touch pad shield, and a negative input coupled to the output of the operational amplifier.

6. The touch pad controller of claim 1, wherein the selector circuit comprises a multiplexer circuit having a plurality of input terminals coupled to the plurality of output terminals of the voltage generator, a plurality of control terminals, and an output terminal for being coupled to the touch pad shield.

7. The touch pad controller of claim 6, further comprising a control circuit coupled to the plurality of control terminals of the multiplexer circuit, the control circuit for causing each of the plurality of input terminals of the multiplexer circuit to be coupled to the output terminal of the multiplexer circuit in a predetermined sequence.

8. The touch pad controller of claim 1, wherein the touch pad shield is on a backside of a touch pad.

9. The touch pad controller of claim 1, wherein the touch pad controller is implemented on a single integrated circuit.

10. A touch pad controller comprising:
a voltage generator having a plurality of output terminals, each of the plurality of output terminals for being coupled to a corresponding pad of a plurality of capacitive touch pads, the voltage generator for providing a predetermined voltage to each of the plurality of capacitive touch pads in a predetermined sequence;
a selector circuit having a plurality of input terminals and an output terminal, each input terminal of the plurality of input terminals coupled to an output terminal of the plurality of output terminals of the voltage generator, the selector circuit for sequentially coupling each output terminal of the plurality of output terminals of the voltage generator to a touch pad shield, the touch pad controller for charging the touch pad shield to a voltage substantially equal to a voltage of each of the plurality of capacitive touch pads; and
a voltage follower having an input terminal coupled to the output terminal of the selector circuit, and an output terminal for being coupled to the touch pad shield.

11. The touch pad controller of claim 10, wherein the voltage generator is characterized as being a capacitance-to-voltage converter.

12. The touch pad controller of claim 10, wherein the voltage follower comprises an operational amplifier having a positive input coupled to the output terminal of the selector circuit, an output coupled to the touch pad shield, and a negative input coupled to the output of the operational amplifier.

13. The touch pad controller of claim 10, wherein the selector circuit comprises a multiplexer circuit having a plurality of input terminals coupled to the plurality of output terminals of the voltage generator, a plurality of control terminals, and an output terminal for being coupled to the touch pad shield.

14. The touch pad controller of claim 13, further comprising a control circuit coupled to the plurality of control terminals of the multiplexer circuit, the control circuit for causing each of the plurality of input terminals of the multiplexer circuit to be coupled to the output terminal of the multiplexer circuit in a predetermined sequence.

15. The touch pad controller of claim 10, wherein the touch pad shield is on a backside of a touch pad.

16. The touch pad controller of claim 10, wherein the touch pad shield comprises a shield ring around each of the plurality of touch pads.

17. The touch pad controller of claim 10, wherein the touch pad controller is implemented on a single integrated circuit.

18. An integrated circuit touch pad controller comprising:
a capacitance-to-voltage converter having a plurality of output terminals, each of the plurality of output terminals for being coupled to a corresponding pad of a plurality of capacitive touch pads, the capacitance-to-voltage converter for providing a predetermined voltage to each of a plurality of touch pads in a predetermined sequence;
a multiplexer circuit having a plurality of input terminals, a plurality of control terminals, and an output terminal, each input terminal of the plurality of input terminals coupled to an output terminal of the plurality of output terminals of the capacitance-to-voltage converter, the selector circuit for sequentially coupling each output terminal of the plurality of output terminals of the capacitance-to-voltage converter to a touch pad shield in response to a plurality of control signals provided to the plurality of control terminals, the touch pad controller for charging the touch pad shield to a voltage substantially equal to a voltage of each of the plurality of touch pads; and
a voltage follower having an input terminal coupled to the output terminal of the selector circuit, and an output terminal for being coupled to the touch pad shield.

19. The touch pad controller of claim 18, wherein the touch pad shield is on a backside of a touch pad.

20. The touch pad controller of claim 18, wherein the touch pad shield comprises a shield ring around each of the plurality of touch pads.

* * * * *